United States Patent [19]

Havlovitz

[11] Patent Number: 4,889,360
[45] Date of Patent: Dec. 26, 1989

[54] UTILITY CARD WITH FOLDABLE HANDLE

[75] Inventor: Paul M. Havlovitz, Escondido, Calif.

[73] Assignee: Republic Tool & Manufacturing Corp., Carlsbad, Calif.

[21] Appl. No.: 272,904

[22] Filed: Nov. 18, 1988

[51] Int. Cl.⁴ .............................................. B62B 1/04
[52] U.S. Cl. .................................. 280/655.1; 16/115; 280/47.18; 280/47.26; 280/47.315; 280/47.371; 280/652; 280/659
[58] Field of Search ............... 280/651, 653, 652, 655, 280/655.1, 659, 657, 658, 47.18, 47.26, 47.24, 47.315, 47.36, 47.371, 47.38, 47.33, 37; 16/111 A, 115

[56] References Cited

U.S. PATENT DOCUMENTS

| 1,442,733 | 1/1923 | Paschoal | 280/47.36 |
| 2,645,502 | 7/1953 | Collins et al. | 280/47.38 |
| 4,253,677 | 3/1981 | Wissler | 280/40 |
| 4,607,856 | 8/1986 | Saleeba | 280/47.18 |
| 4,789,171 | 12/1988 | Porter | 280/47.33 |

FOREIGN PATENT DOCUMENTS

| 817091 | 10/1951 | Fed. Rep. of Germany | 280/47.26 |
| 824299 | 12/1951 | Fed. Rep. of Germany | 280/47.26 |
| 28050 | 4/1956 | Finland | 280/47.37 R |
| 433099 | 4/1948 | Italy | 280/47.36 |
| 1181927 | 9/1985 | U.S.S.R. | 280/655 |
| 178339 | 4/1922 | United Kingdom | 280/47.37 R |

Primary Examiner—Charles A. Marmor
Assistant Examiner—Eric Culbreth
Attorney, Agent, or Firm—Harry Williams

[57] ABSTRACT

What is provided is a utility cart of a one-piece rectilinear design supported by two coaxial wheels, the cart having a lipped or beveled portion at the top of its sidewalls and a U-shaped handle pivoted through respective lipped portions at one end of the cart so that the handle may be easily swung down from an operable position to a folded position within the confines of the overall dimension of the cart. When the handle is in its operable position, the free ends thereof are easily secured under the respective lipped portions to thereby give the entire structure the strength and leverage required for proper load-bearing use.

4 Claims, 1 Drawing Sheet

UTILITY CARD WITH FOLDABLE HANDLE

BACKGROUND OF THE INVENTION

This invention relates to a utility cart having a folding handle that allows the cart to be easily stored within a confined space, such as a car trunk or closet.

Utility carts at present are in vogue primarily because of their usefulness and versatility around the home, especially in the garden, or in areas where light construction or home improvement are taking place. Such carts are popular, too, with travelers of all kinds who find them useful for hauling goods and supplies. In order to make these carts portable and easily stored, many past designs have concentrated on elaborate articulate structures to enable the cart to be folded into a smaller size for easy transport from one location to another. Usually the handle portion of such carts is also articulated in some manner to render it reducable in size and foldable, as well, with the cart structure itself. These articulated cart structures, however, are costly to manufacture and costly, therefore, to the consumer, requiring, as well, a high degree of maintenance and service for their continued operation.

There is need, therefore, to provide an economically manufactured utility cart that is easy to use, easy to transport and easy to store, a cart that will not require an articulated structure to enable it to be used or stored, and will not require any significant degree of maintenance and service.

OBJECTS AND SUMMARY OF THE INVENTION

The present invention has for its primary object and principle purpose to provide a utility cart which will address the aforementioned needs, that is, the provision of a cart which is easy to use, easy to transport and easy to store. Other ancillary objects and purposes of the invention are the provison of a ruggedly constructed utility cart that as a large capacity, that provides for a balanced load on two wheels, that is free of articulated structures yet economically dimensioned for space saving storage, and that has an easily foldable handle that does not need to be removed from the cart.

According to the priciples of the invention, a utility cart is provided in which the-load bearing cart itself is of a one-piece rectilinear design supported by two coaxial wheels, the cart having a lipped or beveled portion at the top of its sidewalls. A U-shaped handle has its free ends pivoted through respective lipped portions at one end of the cart so that the handle may be easily swung down from an operable position to a folded position within the confines of the overall dimension of the cart. When the handle is in its operable position, the free ends thereof are easily secured under the respective lipped portions to thereby give the entire structure the strength and leverage required for proper load-bearing use.

The invention will be better understood and further objects and advantages thereof will become more apparent from the ensuing detailed description of the preferred embodiment taking in conjunction with the drawings.

DETAILED DESCRIPTION OF THE INVENTION

Figure 1:
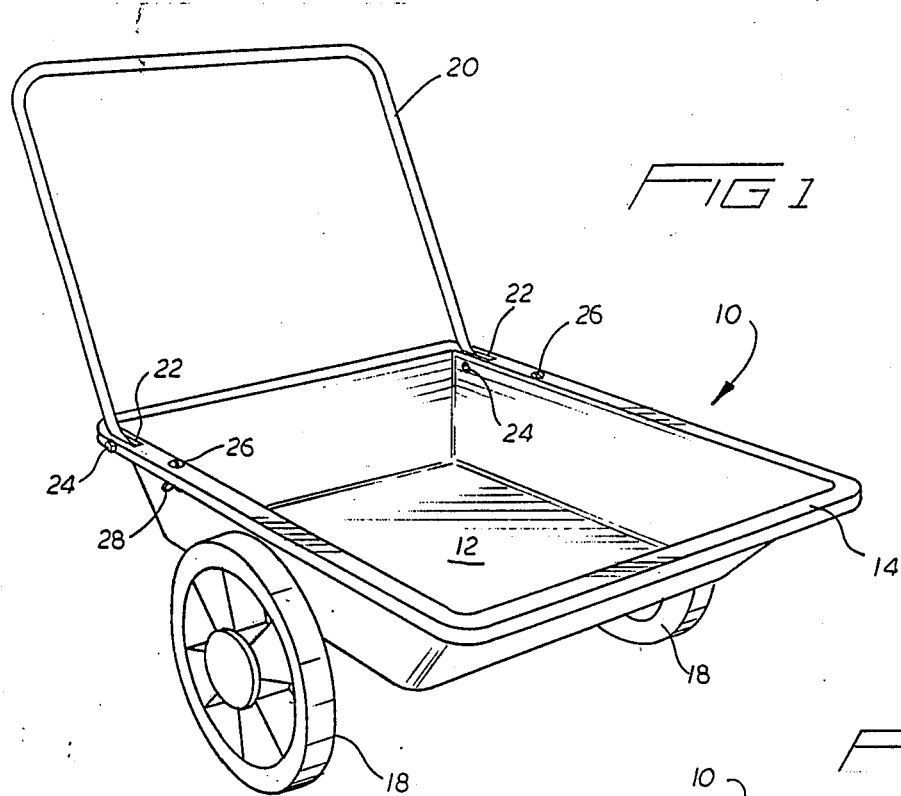
FIG. 1 is schematic perspective showing the cart with its handle extended for operable use.

Referring now to FIG. 1, there is shown a utility cart 10 having a one-piece molded receptacle or load bearing portion 12, which may be a flat surface rather than a receptacle. While plastic is the preferred material, a suitable sheet metal design could be provided using the same principles of the invention. The receptacle 12 is provided with a lipped or beveled portion 14, that is the top of the sidwalls are turned over on themselves. This lipped extension 14 extends around the perimeter of the receptacle, as shown. The lipped extension 14, however, need not extend the full perimeter of the receptacle and could be as easily confined to portions of opposing sidewalls where the handle is accommodated. A pair of coaxial wheels 18 are suitable provided at the base of the cart 10 in the usual well known manner to provide mobility.

A generally U-shaped handle 20 of tubular material, metal usually, is shown pivoted to opposed corner sections of the receptacle 12, the free ends of the handle extending respectively through slots 22 provided in the upper faces of the lipped extension 14. Suitable bolts 24 provide the pivotal support for the handle, the bolts extending through aligned holes in the wall portions of the receptacle and a hole through the handle where the respective free ends are bent away from the rest of the handle, to be more fully discussed below. Another pair of bolts 26 provided with respective wing-nuts 28 secure the free ends of the handle 20 under and along the lipped extension 14, as best shown in FIG. 3, also to be more fully discussed below.

Figure 2:
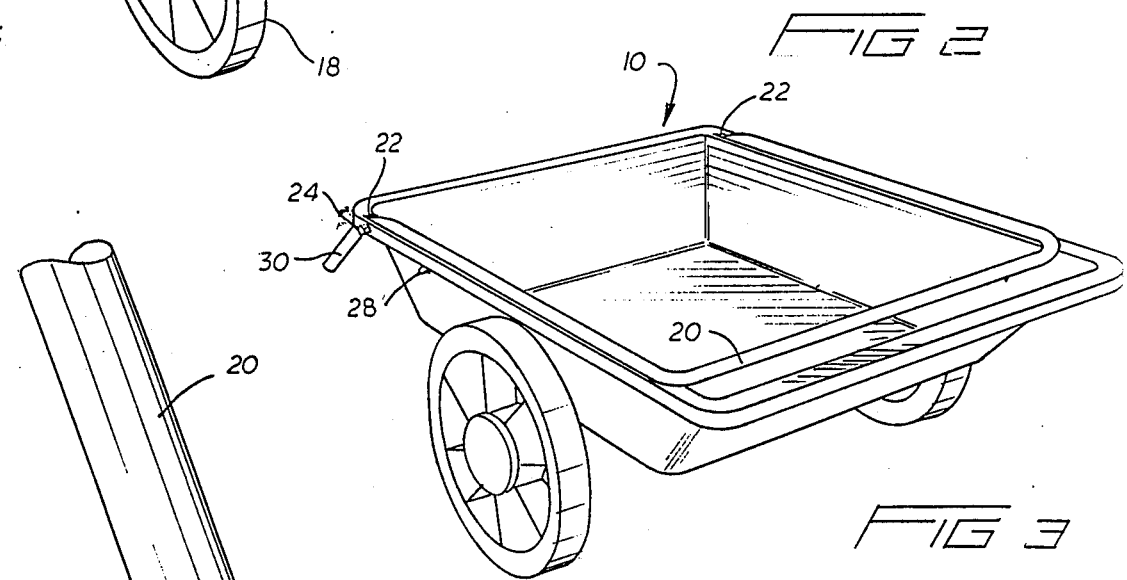
FIG. 2 is a schematic perspective view showing the handle in its folded position.

In FIG. 2 the utility cart according to the invention is shown with the handle in its folded storage position, having been pivoted about its respective pivot supports 24. The free ends 30 of the handle are now seen to extend downwardly and slightly outwardly from the body of the receptacle 12.

Figure 3:
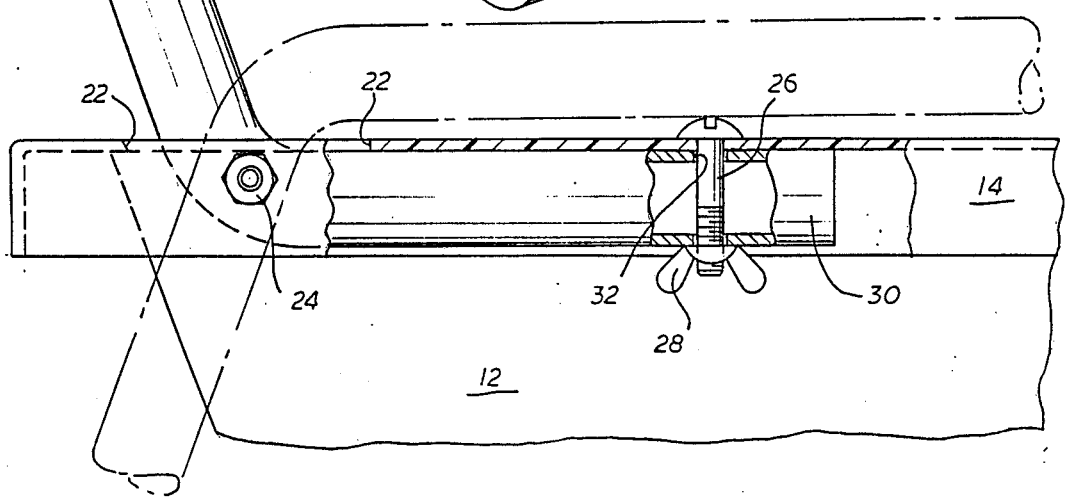
FIG. 3 is a schematic detail in partial cross-section showing the relationship between the handle and the handle-fastening means.

In FIG. 3 the handle support is shown in detail. Where the free ends 30 of the handle 20 bend away a hole is provided through which extend the bolts 24. Aligned holes are also provided on the sidewalls of the receptacle, specifically through the lipped extension portion, which are also in alignment with holes at the bent portion of the handle 20 so that the same can be pivotally supported through the slots 22 in the upper face of the lipped portion 14, as shown. At the free ends of the extension members 30 of the handle 20 are provided suitable holes 32 for receiving bolts 26, as shown. As previously stated, the handle 20 is shown in its operable position in FIGS. 1 and 2. When the wing nuts 28 are loosened and removed from the bolts 26, the bolts are removed and the handle 20 can then be swung into its folded storage position, as shown in phantom in FIG. 3 and in full line in FIG. 2. For this purpose the slot 22 is made long enough to accommodate movement of the pivoted portion of the handle 20 when the same is moved to either its operable position or to its folded position. When the handle 20 is positoned for storage, the bolts 26 and wing-nuts 28 can be returned to their respective holes in the upper face of the lipped extension 14 so as not to be lost when the cart is stored or being transported.

The foregoing relates to preferred exemplary embodiment of the present invention, it being understood that other embodiments and variants thereof are possible within the scope of the invention, the latter being defined by the appended claims.

What is claimed and desired to be secured by Letters Patent of the United States is:

1. A utility cart comprising a load bearing surface, wheel means secured to said load bearing surface, said load bearing surface having respective lipped portions on opposed sidewalls thereof, said lipped portions having slot means therein, a generally U-shaped handle means having free ends extending through said slot means, said free ends extending along the underside of said respective lipped portions, means on said opposed sidewalls for pivoting said handle means, and removable fastening means for securing said free ends of said handle means to the underside of said respective lipped portions, whereby said handle means is free to rotate about said pivot means to a folded inoperable position when said fastening means are removed from said free ends of said handle means.

2. A utility cart according to claim 1, wherein said load bearing surface comprises a molded plastic.

3. A utility cart according to claim 1, wherein said wheels means comprises a pair of coaxial wheels.

4. A utility cart comprising a load bearing surface, wheel means secured to said load bearing surface, said load bearing surface having a lipped extension means extending along a perimeter of said load bearing surface, said lipped extension means having a slot means along the top surface thereof, a generally U-shaped handle means having free ends extending through said slot means, means for pivoting said free ends of said handle means to a vertical portion of said lipped extension means and a wall of said load bearing surface, and removable fastening means for securing said free ends of said handle means to the underside of said lipped extension means, whereby said handle means is free to rotate about said pivot means to a folded inoperable position when said fastening means are removed from said free ends of said handle means.

* * * * *

UNITED STATES PATENT AND TRADEMARK OFFICE
CERTIFICATE OF CORRECTION

PATENT NO. : 4,889,360
DATED : Dec. 26, 1989
INVENTOR(S) : Paul M. Havlovitz

It is certified that error appears in the above-identified patent and that said Letters Patent is hereby corrected as shown below:

ON TITLE PAGE AND COLUMN 1;

In the title--

UTILITY CART WITH FOLDABLE HANDLE

Signed and Sealed this

Twenty-first Day of July, 1992

Attest:

DOUGLAS B. COMER

Attesting Officer    Acting Commissioner of Patents and Trademarks